(12) United States Patent
Lin et al.

(10) Patent No.: US 10,956,176 B2
(45) Date of Patent: Mar. 23, 2021

(54) PROCESSING METHOD, DEVICE AND STORAGE MEDIUM FOR IMPLEMENTING AUTOMATIC STARTUP

(71) Applicant: GUANGDONG OPPO MOBILE TELECOMMUNICATIONS CORP., LTD., Guangdong (CN)

(72) Inventors: Zhiyong Lin, Guangdong (CN); Bing Du, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 111 days.

(21) Appl. No.: 16/107,612

(22) Filed: Aug. 21, 2018

(65) Prior Publication Data

US 2019/0155618 A1 May 23, 2019

(30) Foreign Application Priority Data

Nov. 21, 2017 (CN) .......................... 201711167128.7

(51) Int. Cl.
*G06F 15/177* (2006.01)
*G06F 9/00* (2006.01)
(Continued)

(52) U.S. Cl.
CPC ........ *G06F 9/44505* (2013.01); *G06F 9/4416* (2013.01); *G06F 21/51* (2013.01)

(58) Field of Classification Search
CPC ..... G06F 9/44505; G06F 21/51; G06F 9/4416
See application file for complete search history.

(56) References Cited

U.S. PATENT DOCUMENTS

| 2014/0189783 A1 | 7/2014 | Kapoor et al. |
| 2017/0286193 A1 | 10/2017 | Wang et al. |
| 2017/0286673 A1 | 10/2017 | Lukacs et al. |

FOREIGN PATENT DOCUMENTS

| CN | 104021019 A | 9/2014 |
| CN | 104462978 A | 3/2015 |

(Continued)

OTHER PUBLICATIONS

Espacenet English abstract of CN 105893128 A.
(Continued)

*Primary Examiner* — Xuxing Chen
(74) *Attorney, Agent, or Firm* — Ladas & Parry LLP (57) ABSTRACT

Embodiments of the present application disclose a processing method, a device, a storage medium, and a mobile terminal for implementing automatic startup. The method includes: acquiring, by a processing device for implementing automatic startup, at least one of program startup information and startup call information of an application when it is detected that a startup event for the application occurs; sending, by the processing device for implementing automatic startup, the at least one of the program startup information and the startup call information to a server for acquiring a determination strategy for the application serving as a startup control strategy for the application, wherein the determination strategy is obtained by the server through analyzing the at least one of the program startup information and the startup call information; controlling, by the processing device for implementing automatic startup, startup of the application according to the startup control strategy for the application.

17 Claims, 7 Drawing Sheets

(51) Int. Cl.
*G06F 9/445* (2018.01)
*G06F 21/51* (2013.01)
*G06F 9/4401* (2018.01)

(56) References Cited

FOREIGN PATENT DOCUMENTS

| | | |
|---|---|---|
| CN | 105446811 A | 3/2016 |
| CN | 105893128 A | 8/2016 |
| CN | 106127030 A | 11/2016 |
| CN | 106874086 A | 6/2017 |
| CN | 106874089 A | 6/2017 |
| CN | 106933684 A | 7/2017 |
| CN | 107748684 A | 3/2018 |

OTHER PUBLICATIONS

Espacenet English abstract of CN 106933684 A
Espacenet English abstract of CN 106127030 A.
Espacenet English abstract of CN 107748684 A.
English translation of CN 105446811 A.
European Search Report (ESR) dated Mar. 28, 2019 for Application No. EP 18202038.8.
The first Office Action of corresponding Chinese patent application No. 201711167128.7 dated Jan. 2, 2020.
The second OA of priority application No. 201711167128.7 dated Aug. 10, 2020.
The Notice of Rejection of the priority application No. 201711167128.7 dated Oct. 28, 2020.
The first Office Action of corresponding Indian application No. 201814041859, dated Dec. 21, 2020.

PROCESSING METHOD, DEVICE AND STORAGE MEDIUM FOR IMPLEMENTING AUTOMATIC STARTUP

CROSS-REFERENCE TO RELATED APPLICATION

This application claims priority to Chinese Patent Application No. 201711167128.7, filed on Nov. 21, 2017, which is hereby incorporated by reference in its entirety.

TECHNICAL FIELD

The embodiment of the present application relates to the field of computers, and in particular, to a processing method, a device and a storage medium for implementing automatic startup.

BACKGROUND

Intelligent systems have become the most acceptable mobile terminal operating systems for users. A user will actively or passively install various third-party applications while using the mobile terminal. Startup manners of some third-party applications are known and can be controlled by some means; while the startup manners of some third-party applications are unknown and cannot be controlled by valid strategies. Startup of these applications affects a standby capability of the mobile terminal, and causes excessive memory overhead, thus affecting a running speed of the mobile terminal. Therefore, the application with an unknown startup manner is required to be processed.

SUMMARY

Embodiments of the present application provide a processing method, a device and a storage medium for implementing automatic startup in an unknown startup manner that can achieve the effect of processing an application with an unknown startup manner in the mobile terminal.

In a first aspect, an embodiment of the present application provides a processing method for implementing automatic startup, where the method includes:

acquiring, by a processing device for implementing automatic startup, at least one of program startup information and startup call information of an application when it is detected that a startup event for the application occurs;

sending, by the processing device for implementing automatic startup, the at least one of the program startup information and the startup call information to a server for acquiring a determination strategy for the application serving as a startup control strategy for the application, wherein the determination strategy is obtained by the server through analyzing the at least one of the program startup information and the startup call information;

controlling, by the processing device for implementing automatic startup, startup of the application according to the startup control strategy for the application.

In a second aspect, an embodiment of the present application provides a processing device for implementing automatic startup, where the device includes:

a processor, configured to acquire at least one of program startup information and startup call information of an application when it is detected that a startup event for the application occurs;

a transmitter, configured to send the at least one of the program startup information and the startup call information to a server for acquiring a determination strategy for the application serving as a startup control strategy for the application, wherein the determination strategy is obtained by the server through analyzing the at least one of the program startup information and the startup call information;

the processor is further configured to control startup of the application according to the startup control strategy for the application.

In a third aspect, an embodiment of the present application provides a computer readable storage medium stored with a computer program thereon, wherein the program is executed by a processor to implement the following steps:

acquiring, by a processing device for implementing automatic startup, at least one of program startup information and startup call information of an application when it is detected that a startup event for the application occurs;

sending, by the processing device for implementing automatic startup, the at least one of the program startup information and the startup call information to a server for acquiring a determination strategy for the application serving as a startup control strategy for the application, wherein the determination strategy is obtained by the server through analyzing the at least one of the program startup information and the startup call information;

controlling, by the processing device for implementing automatic startup, startup of the application according to the startup control strategy for the application.

In the technical solution provided by the embodiment of the present application, at least one of program startup information and startup call information of the application are acquired when it is detected that a startup event for the application occurs; the at least one of the program startup information and the startup call information are sent to a server for acquiring a determination strategy for the application serving as a startup control strategy for the application, where the determination strategy is obtained by the server through analyzing the at least one of the program startup information and the startup call information; startup of the application is controlled according to the startup control strategy for the application. By adopting the technical solution provided by the application, the processing of an application in the mobile terminal with an unknown startup manner can be achieved.

DESCRIPTION OF EMBODIMENTS

The technical solutions of the present application will be further described below with reference to the accompanying drawings and specific embodiments. It is appreciated that the specific embodiments described herein are for illustrative purposes only and are not intended to limit the present application. In addition, it should be noted that, only some but not all of the structures related to the present application are shown in the drawings for convenience of description.

Before discussing the exemplary embodiments in more detail, it should be noted that some exemplary embodiments are described as processing or methods in the form of flowcharts. Although the flowcharts describe various steps as being processed in order, many of the steps can be implemented in parallel, concurrently, or simultaneously. In addition, the order of the steps can be rearranged. The processing may be terminated when its operation is completed, and may include additional steps not shown in the figures. The processing may correspond to methods, functions, procedures, subroutines, subprograms, etc.

Figure 1:
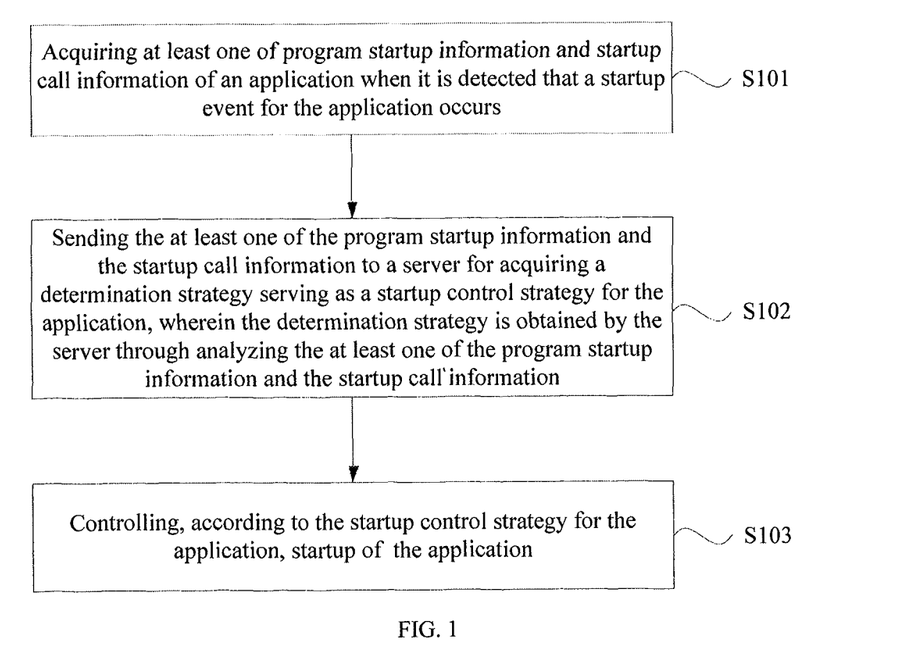
FIG. 1 is a schematic flowchart of a processing method for implementing automatic startup according to an embodiment of the present application.

FIG. 1 is a schematic flowchart of a processing method for implementing automatic startup according to an embodiment of the present application. The method may be performed by a processing device that implements automatic startup in an unknown manner, where the device may be implemented by software and/or hardware, and can be integrated in a mobile terminal generally. As shown in FIG. 1, the method includes:

S101: acquiring at least one of program startup information and startup call information of the application when it is detected that a startup event for the application occurs.

Where the application can be a program in a system, such as a camera, an alarm clock, a calendar, or a third-party application such as an online shopping application and a video playback application installed by users based on preferences. The advantage of this setting in this embodiment is that when the application is started, not only the third-party application starts automatically, the system application also starts automatically or is started by the third-party application in an association manner, which causes additional overhead of the system memory and affects an operating speed of the system of the mobile terminal.

In an embodiment of the present application, the mobile terminal may be a smart terminal such as a smart phone, a tablet computer or a personal digital assistant. The mobile terminal obtains program startup information when detecting that a startup event for the application occurs. Where the mobile terminal may determine that the startup event for the application occurs by detecting creation of a process when the application is started or a broadcast message being sent when the application is started. In this embodiment, when a broadcast message is detected, in the case that if the application has subscribed the broadcast message and is started according to a broadcast message, the broadcast message can be determined to be the startup event for the application when it is detected that the application has subscribed and is started based on this broadcast message.

It should be noted that the embodiment of the present application is directed to a processing method for an application which implements automatic startup in an unknown manner. When an application is started in a known manner, a processing method equivalent to that for startup in an unknown manner may be used, or the application may be started directly according to an existing startup control strategy.

In an embodiment of the present application, optionally, the startup information of the program may be a package name and package information of the application. Where, when the startup event for the application is a process creation, since the process creation is managed by the ActivityManagerService service, in a code process for a system service, various information of the process to be started may be collected, including but not limited to the package name, package information, and the like of the application to which the process belongs, as well as startup call information.

In the technical solution of the present application, optionally, the startup call information includes: a startup caller, a startup call component and a startup call path. Where the caller may be an originator of a function that calls the application; the call component may be at least one of an Activity component, a Service component, a Content Provider component and a Broadcast Receiver component; the startup call path may be a specific startup call path corresponding to the call component, such as calling to start and run in the background or calling to start and run in the foreground.

Where the startup call path may be called in the form of components, specifically, an Activity component, a Service component, a Content Provider component, a Broadcast Receiver component, etc., in the Android system, and the caller may be an application that calls the application through the above components.

It should be noted that when one of the startup caller, the startup call component and the startup call path in the startup call information is unknown, it can be determined that the application is started in an unknown manner.

Exemplarily, when the user accesses a webpage, a video playback application can be called through the Activity component, and when the user accesses a music playback application, the system alarm clock and the like can be called through the Broadcast Receiver component. We can determine from this that the caller of the application startup can be either a system application or a third-party application. It should be noted that the Android system is only taken as an example in the embodiment of the present application, the technical solution provided by the embodiment of the present application is not limited to being applied to the Android system, and other operating systems may also process the application startup according to the technical solution provided by the embodiment of the present application.

S102: sending the at least one of the program startup information and the startup call information to a server for acquiring a determination strategy for the application serving as a startup control strategy for the application, where the determination strategy is obtained by the server through analyzing the at least one of the program startup information and the startup call information.

Where the startup strategy may be to start when the package name or the package information satisfies a certain requirement, or may be a control manner determined according to the caller or the startup call path. Determining the startup control strategy may be to determine whether the startup requirement is satisfied to start an application according to a big data statistical result of the server in the case that the startup call information is undetermined. For example, based on the big data statistics result of the server, although the currently started application is started in the case that the call path or the caller is not determined, a large amount of data shows that the application startup can provide a good user experience, then the determination strategy for the application can be determined as an allowable startup. By counting whether the user performs an operation to stop the application during the application startup, or determining, according to the startup control strategy for the user's mobile terminal, whether the application cannot start automatically, and if so, the determination strategy for the application can be determined as a unallowable startup.

The determination strategy is obtained by the server through analyzing at least one of the program startup information and the startup call information. For example, the package name and the package information of the application can be analyzed to determine memory usage and the network usage of the application in the mobile terminal, and whether the application is frequently used by the user so as to further determine the determination strategy for the application. By counting whether the number of the callers of the application in a large number of mobile terminals is greater than a certain threshold, for example, the application can be called and started by 100 callers, and if so, the application is determined to be a malicious startup application, and then, the determination strategy for the application is determined.

The mobile terminal may use the acquired determination strategy of the server as the startup control strategy for the application, or may adjust the acquired determination strategy of the server and then use it as the startup control strategy. After determining the startup control strategy, the mobile terminal may stop the application after the application is started, or terminate the startup during the application startup process, or control the startup of the application using the startup control strategy when the application is started again.

S103: controlling, according to the startup control strategy for the application, startup of the application.

In one possible implementation manner, determining whether to start the application or not according to the startup control strategy for the application when it is detected that the startup event for the application occurs again. Where the application can be normally started when the obtained program startup information satisfies the startup requirement in the startup control strategy for the application; the application can be prohibited to be started when the obtained program startup information does not satisfy the startup requirement of the startup control strategy for the application. Where the way to prohibit the startup of the application may include prohibiting the creation of its process, prohibiting its use of memory, and any other way that can prohibit its normal startup.

It should be noted that, in the embodiment of the present application, the collected program startup information or startup call information may be uploaded to the server for classification, statistics, and analyzation. The advantage of this setting is that advantages of the server which are a large amount of information data, sufficient storage space and a sufficient computing capability can be taken to avoid significant impacts on storage space and running space of the mobile terminal.

In the technical solution provided by the embodiment of the present application, at least one of program startup information and startup call information of the application are acquired when it is detected that a startup event for the application occurs; the at least one of the program startup information and the startup call information are sent to a server for acquiring a determination strategy for the application serving as a startup control strategy for the application, where the determination strategy is obtained by the server through analyzing the at least one of the program startup information and the startup call information; whether to start the application or not is determined according to the startup control strategy for the application when it is detected that the application is started again. By adopting the technical solution provided by the application, the processing of an application in the mobile terminal with an unknown startup manner can be achieved.

On the basis of the above technical solution, optionally, where the acquiring the program startup information when it is detected that a startup event for the application occurs, includes: acquiring the program startup information and the startup call information of the application through a process management service when it is detected that a first process during startup of the application is created.

Where, one or more processes can be created during the startup process of the application, and when the first process is created, it can be determined that the startup event for the application occurs. For example, each application in the Android system is designed as a separate process, and the application can determine whether to start multiple processes as required. The application process created by the Android application framework layer has two characteristics: one is that an entry function of the process is ActivityThread.main, and the other one is that the application process supports the Binder inter-process communication mechanism.

Since the application process supports the Binder inter-process communication mechanism, the inter-application association startup and automatic startup can be achieved. For example, the third-party application will start automatically when a broadcast message is acquired, where the broadcast message indicates that a network connection in the Broadcast Receiver component switches from a mobile network connection to a wireless network connection, it is because that the application process supports the Binder inter-process communication mechanism. For example, many applications are set to start automatically when receiving some broadcast messages so as to keep alive, and startup of these applications often occupies a certain amount of memory space of the mobile terminal. In this case, some prohibited startup items can be defined in the startup control strategy for the application. The startup of the application is terminated when the program startup information contains a prohibited startup item to avoid occupying the memory of the mobile terminal.

On the basis of the above technical solution, the processing method for implementing automatic startup in an unknown startup manner further includes: if it is determined, according to the startup control strategy for the application, not to start the application, recycling the first process of the application. Where in the Android system, processes are divided into six levels, which are, in a descending order of priorities, as follows: a foreground process (FOREGROUND_APP), a visible process (VISIBLE_APP), a secondary service process (SECONDARY_SERVER), a background process (HIDDEN_APP), a content provider node (CONTENT_PROVIDER) and an empty process (EMPTY_APP). Where, if a process contains both service and a visible activity, the process is classified as a visible process rather than a service process; in addition, the level of a process can be upgraded if another process depends thereon. For example, the service in a process A is bound to a component in a process B, and the process A will always be considered at least as important as the process B; the phone service in the system is classified as a foreground process instead of a secondary service process; an oom_adj value of a process in the Android system also represents its priority, the higher the oom_adj value, the lower the priority of the process. The current oom_adj value of a process can be viewed through adb shell cat/proc/<pid>/oom_adj, and the updating of the oom_adj value of a process and the oom_adj value of an android process are all updated in the ActivityManagerService.

The recycling of a process, lowmemorykiller: referring to the lowmem_shrink function of lowmemorykiller.c to calculate which process should be recycled and sending a SIGKILL signal to kill the process. The specific recycling is implemented by the function trimApplications( ) in ActivityManagerService.java. First, a useless process whose package has been removed is removed, the oom_adj value based on the current state of the process is updated, and then following operations are performed: the process without a running activity is removed, if the application has saved all the activities' states, the application is stopped. Finally, if there are still a lot of running activities, those activities whose states have already been saved are removed. If it is determined, according to the startup control strategy for the application, not to start the application, the first process created during the startup of the application is recycled to release its memory, thereby releasing the memory occupied by the application. The advantage of this setting in the technical solution is that the first process created by the application whose startup is prohibited can be recycled, thus releasing memory.

The advantage of this setting is that when the application is created, after the package name and other information of the application are determined, whether the application satisfies the startup strategy or not is determined and the application is processed at once. The advantage of this setting is that the startup control speed of the application can be improved, thereby avoiding the occupation of the memory of the mobile terminal due to complete startup of the application when the control actually works.

Figure 2:
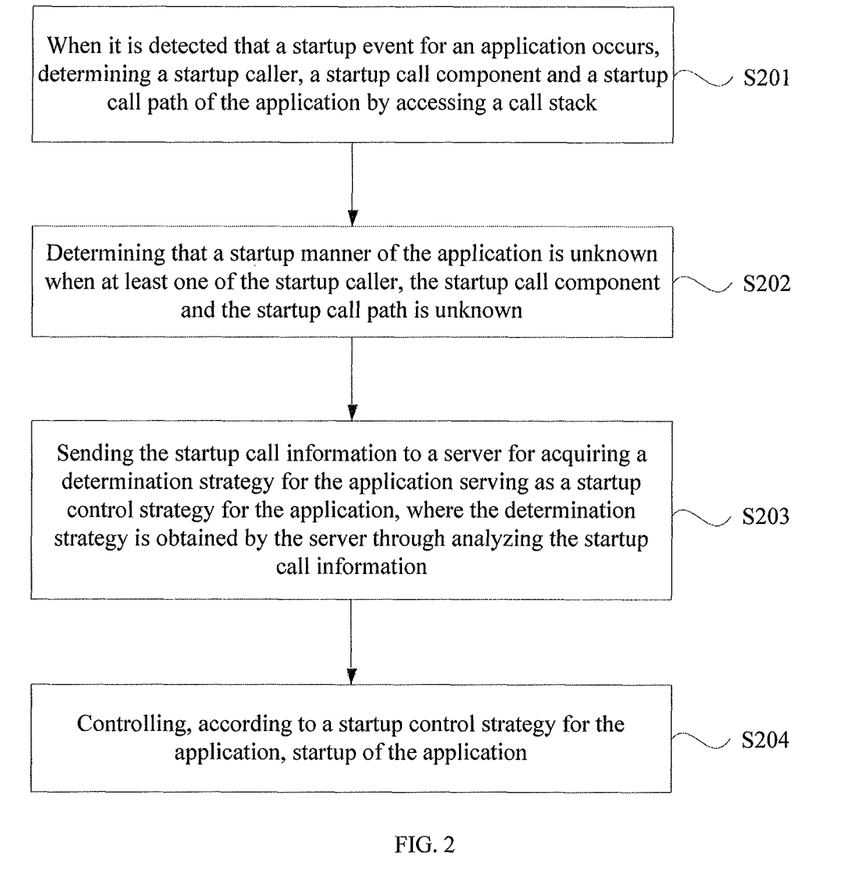
FIG. 2 is a schematic flowchart of another processing method for implementing automatic startup according to an embodiment of the present application.

FIG. 2 is a schematic flowchart of another processing method for implementing automatic startup according to an embodiment of the present application. As shown in FIG. 2, the method includes:

S201: when it is detected that a startup event for an application occurs, determining a startup caller, a startup call component and a startup call path of the application by accessing a call stack.

Where the call stack may be a stack that encapsulates a call function or a call operation. The caller of the application and the specific startup call path can be determined by accessing the call stack and acquiring the startup call information from the call stack. For example, when an application is started in an unknown manner, the unknown manner may be found by accessing the call stack, that is, by finding a starting point of the startup of the application through a layer-by-layer path. For example, A calls a function XXX, and the function XXX calls a system function XXX2; the function XXX2 calls a system function XXX3; the function XXX3 calls a system function XXX4, thus calling a startup process function StartProcess.

S202: determining that a startup manner of the application is unknown when at least one of the startup caller, the startup call component and the startup call path is unknown.

S203: sending the startup call information to a server for acquiring a determination strategy for the application serving as a startup control strategy for the application, where the determination strategy is obtained by the server through analyzing the startup call information.

S204: controlling, according to a startup control strategy for the application, startup of the application.

On the basis of the above technical solutions, the present technical solution provides a method for determining the startup call information of the application by accessing the call stack, thereby providing a data foundation for determining whether the application is started in an unknown startup manner, thereby improving the startup control speed of the application, and avoiding the occupation of the memory of the mobile terminal due to complete startup of the application when the control actually works.

Figure 3:
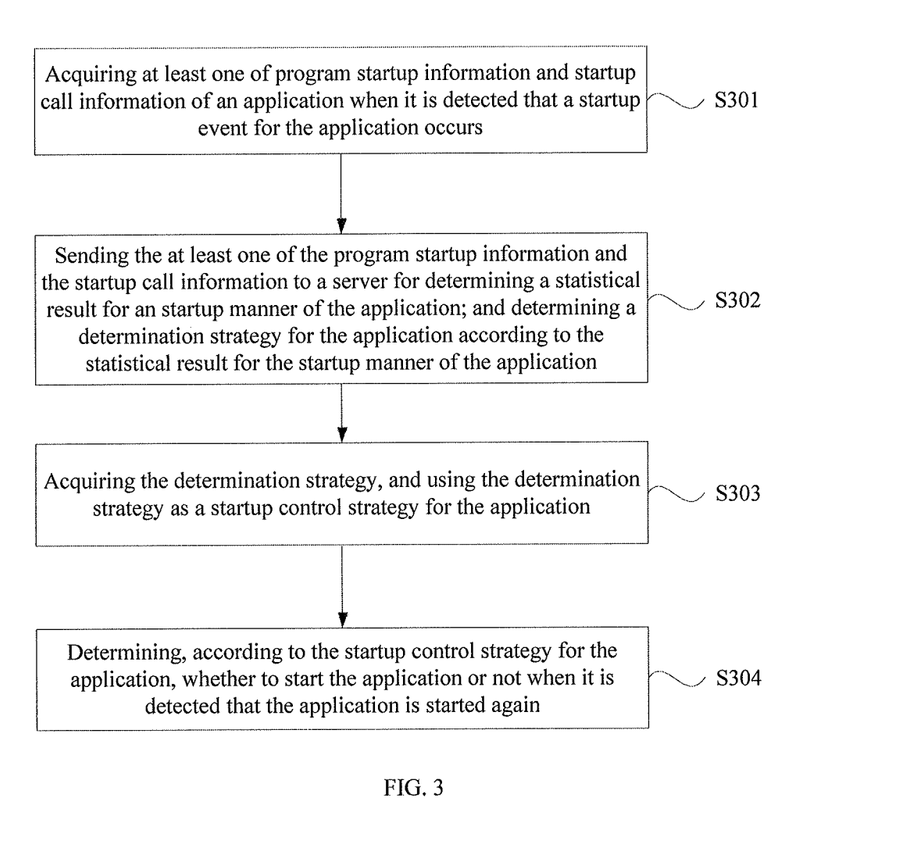
FIG. 3 is a schematic flowchart of yet another processing method for implementing automatic startup according to an embodiment of the present application.

FIG. 3 is a schematic flowchart of yet another processing method for implementing automatic startup according to an embodiment of the present application. As shown in FIG. 3, the method includes:

S301: acquiring at least one of program startup information and startup call information of an application when it is detected that a startup event for the application occurs.

S302: sending the at least one of the program startup information and the startup call information to a server for determining a statistical result for an startup manner of the application; and determining a determination strategy for the application according to the statistical result for the startup manner of the application.

Where the statistical result of the startup manner may be the statistics based on the startup manners of the application in a set number of mobile terminals. Where the set number may be 1,000 or more, as long as the statistical result for the startup manner of the application can be determined according to a large amount of statistical data. If a call manner that a caller A calls an application accounts for 93% of the statistical results, then when the startup manner of the application in the mobile terminal is to be started under the call of the caller A, then it can be considered as a reasonable startup. In this way, the determination strategy for the application can be determined according to the statistical result of the startup manner.

S303: acquiring the determination strategy, and using the determination strategy as a startup control strategy for the application.

After acquiring the determination strategy delivered by the server, the mobile terminal may update the startup control strategy for the application (if there already exists a startup strategy for the application), or may encapsulate the determination strategy in an application startup management module as the startup control strategy for the application.

Where the application startup management module may be a module that has been stored inside the mobile terminal for managing the startup of the mobile terminal. Where the application startup management module may be specifically configured to collect, analyze, store the startup strategy and the like. The application startup management module may contain startup management policies for some or all of the applications in the mobile terminal. Whether to start the application or not is jointly determined according to the startup control strategy for the application and the processing strategy corresponding to the application that is stored in the application startup management module and implements automatic startup in an unknown manner, so that the startup of the application may be better processed. On the basis of the above technical solution, optionally, the processing strategy corresponding to the application that is stored in the application startup management module and implements automatic startup in an unknown manner can be updated. The advantage of this setting is to ensure that the adopted startup control strategy is complied with updating operations of a user or with updating operations inside the system.

S304: controlling, according to the startup control strategy for the application, startup of the application.

On the basis of the above technical solutions, the technical solution provides a method for determining the determination strategy according to the startup manner of the application which is obtained based on statistical analysis of the server, and the advantage of this setting is that accurate processing for the startup of the application can be achieved, and inconvenience brought to users due to errors in the processing manner can be avoided.

Figure 4:
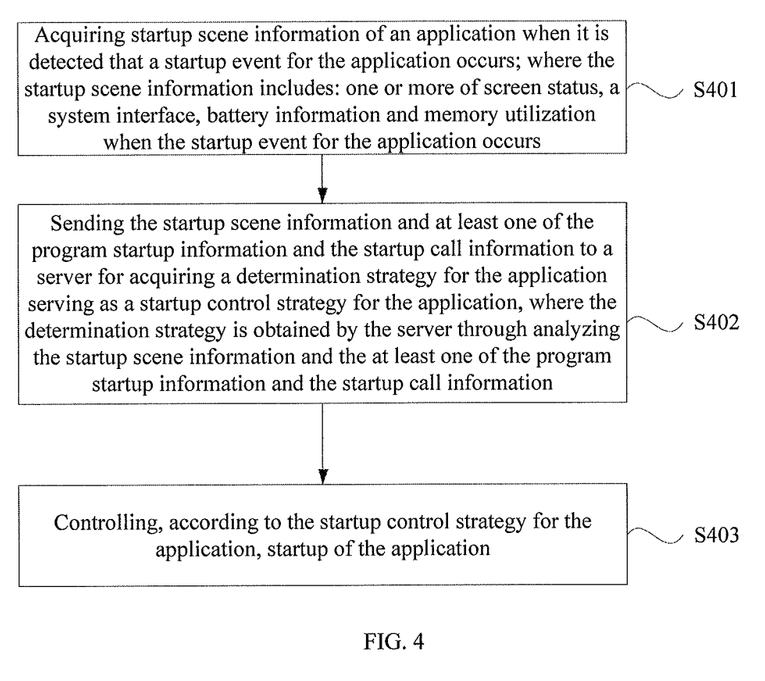
FIG. 4 is a schematic flowchart of yet another processing method for implementing automatic startup according to an embodiment of the present application.

FIG. 4 is a schematic flowchart of yet another processing method for implementing automatic startup according to an embodiment of the present application. As shown in FIG. 4, the method includes:

S401: acquiring startup scene information of an application when it is detected that a startup event for the application occurs; where the startup scene information includes: one or more of screen status, a system interface, battery information and memory utilization when the startup event for the application occurs.

After acquiring the startup scene information, the startup control strategy for the application may be determined according to the program startup information and the startup scene information of the application. For example, the startup of an application is prohibited when the application running in the foreground is a non-browser program, or the memory occupancy rate is up to 80%, or the battery power is already below 10%. It should be noted that the program startup information can be different for each program, and the startup scene information is more to reflect the current operating status of the mobile terminal, which can be common, but it does not exempt individual applications from adopting a separate strategy for the startup scene information. For example, in an off-screen state, it should be prohibited if some third-party applications start automatically for keeping alive, and the service should be provided as well in the off-screen state if the service information is, such as an alarm clock.

S402: sending the startup scene information and at least one of the program startup information and the startup call information to a server for acquiring a determination strategy for the application serving as a startup control strategy for the application, where the determination strategy is obtained by the server through analyzing the startup scene information and the at least one of the program startup information and the startup call information.

Correspondingly, while at least one of the program startup information and the startup call information are sent to the server, the startup scene information may also be sent to the server, so that analyzation may be done upon comprehensive consideration of the startup scene when the application is started in an unknown manner. In doing so, the accuracy for determining the determination strategy by the server is further improved, and whether to start the application or not can be determined according to the current state of the mobile terminal S403: controlling, according to the startup control strategy for the application, startup of the application.

On the basis of the above technical solutions, the technical solution provides a solution in which the startup scene information is sent to the server in addition to at least one of the program startup information and the startup call information. The advantage of this setting is that the processing for implementing automatic startup of the application may be more intelligent and actual requirements of the user can be satisfied.

Figure 5:
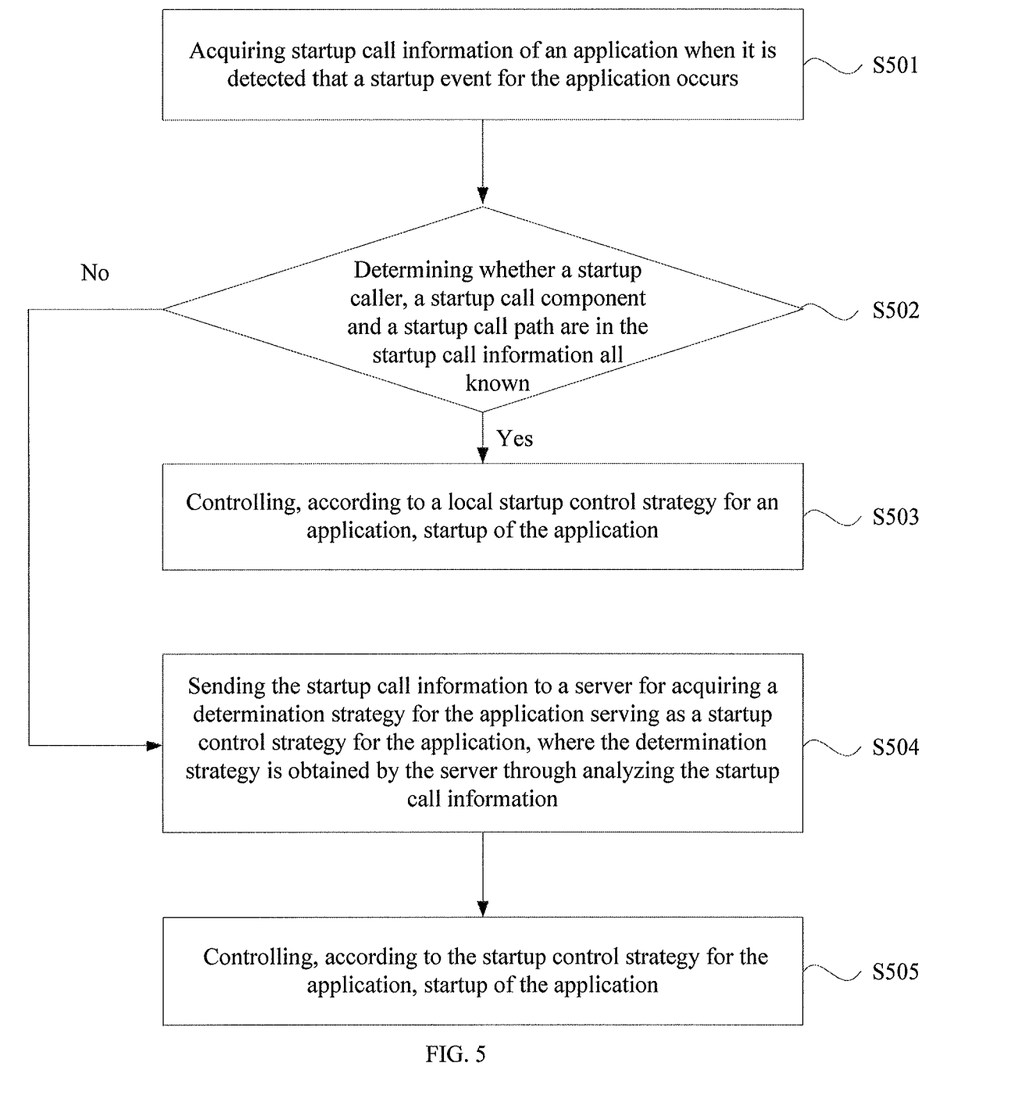
FIG. 5 is a schematic flowchart of yet another processing method for implementing automatic startup according to an embodiment of the present application.

FIG. 5 is a schematic flowchart of yet another processing method for implementing automatic startup according to an embodiment of the present application. As shown in FIG. 5, the method includes:

S501: acquiring startup call information of an application when it is detected that a startup event for the application occurs.

S502: determining whether a startup caller, a startup call component and a startup call path are in the startup call information all known; if so, perform S503; if not, perform S504.

S503: controlling, according to a local startup control strategy for an application, startup of the application.

S504: sending the startup call information to a server for acquiring a determination strategy for the application serving as a startup control strategy for the application, where the determination strategy is obtained by the server through analyzing the startup call information.

S505: controlling, according to the startup control strategy for the application, startup of the application.

On the basis of the above technical solutions, the technical solution provides a processing method in the case where the startup caller, the startup call component and the startup call path in the startup call information are all known. The advantage of this setting is that more intelligent processing can be performed on the startup of the application, and the startup processing efficiency of the application can be improved to meet actual requirements of the user.

Figure 6:
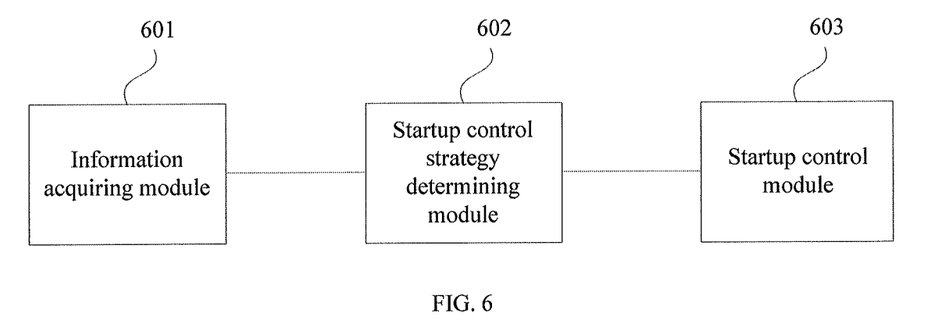
FIG. 6 is a structural block diagram of a processing device for implementing automatic startup according to an embodiment of the present application.

FIG. 6 is a structural block diagram of a processing device for implementing automatic startup according to an embodiment of the present application. The device may be implemented by software and/or hardware, is generally integrated in a mobile terminal, and can adjust the volume of the mobile terminal by performing a processing method for implementing automatic startup. As shown in FIG. 6, the device includes:

an information acquiring module 601, configured to acquire at least one of program startup information and startup call information of an application when it is detected that a startup event for the application occurs;

a startup control strategy determining module 602, configured to send the at least one of the program startup information and the startup call information to a server for acquiring a determination strategy for the application serving as a startup control strategy for the application, where the determination strategy is obtained by the server through analyzing the at least one of the program startup information and the startup call information;

a startup control module 603, configured to control, according to the startup control strategy for the application, startup of the application.

In the technical solution provided by the embodiment of the present application, at least one of the program startup information and the startup call information of the application program are acquired when it is detected that a startup event for the application occurs; the at least one of the program startup information and the startup call information are sent to a server for acquiring a determination strategy for the application serving as a startup control strategy for the application, where the determination strategy is obtained by the server through analyzing the at least one of the program startup information and the startup call information; startup of the application is controlled according to the startup control strategy for the application. By adopting the technical solution provided by the application, the processing of an application in the mobile terminal with an unknown startup manner can be achieved.

On the basis of the above technical solutions, optionally,

The program startup information includes: a package name and package information of an application.

The startup call information includes: a startup caller, a startup call component and a startup call path.

On the basis of the above technical solutions, optionally, the information acquiring module 601 is configured to:

acquire the program startup information of the application through a process management service.

On the basis of the above technical solutions, optionally, where the information acquiring module 601 is configured to acquire the startup call information of the application, includes:

determining the startup call information by accessing a call stack.

On the basis of the above technical solutions, optionally, the startup control strategy determining module 602 is configured to:

determine a startup manner of the application according to the startup call information;

in response to determining that the startup manner of the application is unknown, send the at least one of the program startup information and the startup call information to the server;

in response to determining that the startup manner of the application is known, set a local startup control strategy as the startup control strategy for the application.

On the basis of the above technical solutions, optionally, the startup control strategy determining module 602 is configured to:

send the at least one of the program startup information and the startup call information to the server for determining a statistical result for the startup manner of the application; and determine a determination strategy for the application according to the statistical result for the startup manner of the application;

acquire the determination strategy, and using the determination strategy as the startup control strategy for the application.

On the basis of the above technical solutions, optionally, the startup scene information acquiring module is further included, which is configured to:

acquire startup scene information when it is detected that a startup event for the application occurs, where the startup scene information includes: one or more of screen status, a system interface, battery information and memory utilization when the startup event for the application occurs;

correspondingly, the startup control strategy determining module 602 is specifically configured to:

send the startup scene information and the at least one of the program startup information and the startup call information to the server for acquiring a determination strategy for the application serving as the startup control strategy for the application, where the determination strategy is obtained by the server through analyzing the startup scene information and the at least one of the program startup information and the startup call information.

On the basis of the above technical solutions, the startup call information includes a startup caller, a startup call component and a startup call path.

On the basis of the above technical solutions, optionally, the startup control strategy determining module 602 is specifically configured to:

determine that the startup manner of the application is unknown when at least one of the startup caller, the startup call component and the startup call path is unknown;

determine that the startup manner of the application is known when the startup caller, the startup call component, and the startup call path are all known.

The above product may perform the method provided by any embodiment of the present application, and may have corresponding functional modules and beneficial effects for performing the method.

An embodiment of the present application further provides a storage medium including a computer executable instruction that is executed by a computer processor to perform a processing method for implementing automatic startup, the method includes:

acquiring at least one of program startup information and startup call information of an application when it is detected that a startup event for the application occurs;

sending the at least one of the program startup information and the startup call information to a server for acquiring a determination strategy for the application serving as a startup control strategy for the application, where the determination strategy is obtained by the server through analyzing the at least one of the program startup information and the startup call information;

controlling, according to the startup control strategy for the application, startup of the application.

Storage media refers to any memory devices or storage devices of various types. The term "storage medium" is intended to include: a mounting medium, such as a CD-ROM, a floppy disk or a tape device; a computer system memory or a random access memory such as a DRAM, a DDR RAM, an SRAM, an EDO RAM, a Rambus RAM, etc.; a non-volatile memory, such as a flash memory and a magnetic media (such as a hard disk or an optical storage); a register or other similar types of memory elements, and the like. The storage medium may further include other types of memories or a combination thereof. In addition, the storage medium may be located in a computer system in which a program is executed, or may be located in a different second computer system which is connected to the computer system via a network, such as the Internet. The second computer system can provide the program instruction to the computer for execution. The term "storage medium" can include two or more storage media that may reside in different locations (for example, in different computer systems connected through a network). A storage medium may store the program instruction (for example, specifically implemented as a computer program) executable by one or more processors.

Of course, the storage medium provided by the embodiment of the present application contains computer executable instructions, where the computer executable instruction is not limited to the above described processing operations for implementing automatic startup, and may also perform operations related to the processing method for implementing automatic startup provided in any embodiment of the present application.

Figure 7:
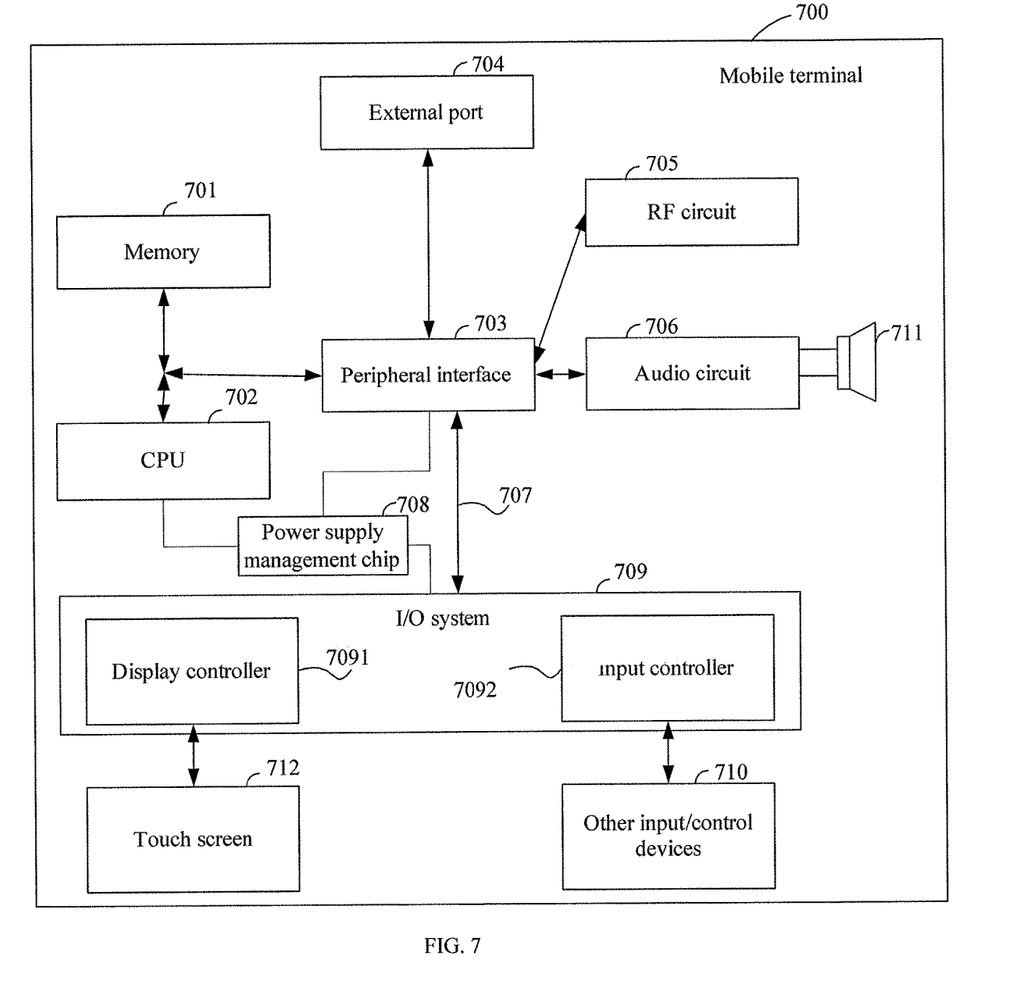
FIG. 7 is a schematic structural diagram of a mobile terminal according to an embodiment of the present application.

An embodiment of the present application provides a mobile terminal where the processing device for implementing automatic startup provided by the embodiment of the present application can be integrated. FIG. 7 is a schematic structural diagram of a mobile terminal according to an embodiment of the present application. As shown in FIG. 7, the mobile terminal may include: a memory 701, a central processing unit (CPU) 702 (also referred to as a processor, hereinafter referred to as CPU), a circuit board (not shown), and a power circuit (not shown). The circuit board is disposed inside a space enclosed by the housing; the CPU 702 and the memory 701 are disposed on the circuit board; the power circuit is configured to supply power to each circuit or device of the mobile terminal; the memory 701 is configured to store executable program codes; the CPU 702 runs a computer program corresponding to the executable program codes by reading executable program codes stored in the memory 701 to implement following steps:

acquiring at least one of program startup information and startup call information of an application when it is detected that a startup event for the application occurs;

sending the at least one of the program startup information and the startup call information to a server for acquiring a determination strategy for the application serving as a startup control strategy for the application, where the determination strategy is obtained by the server through analyzing the at least one of the program startup information and the startup call information;

controlling, according to the startup control strategy for the application, startup of the application.

The mobile terminal further includes: a peripheral interface 703, a radio frequency (RF) circuit 705, an audio circuit 706, a speaker 711, a power supply management chip 708, an input/output (I/O) subsystem 709, a touch screen 712, and other input/control devices 710 and an external port 704, these components communicate with each other via one or more communication buses or signal lines 707.

It should be understood that the illustrated mobile terminal 700 is merely one example of the mobile terminal, and the illustrated mobile terminal 700 may have more or fewer components than those shown in the figures, or may combine two or more of the components, or may have different component configurations. The various components shown in the figures can be implemented in hardware, software, or a combination of hardware and software, including one or more signal processing and/or specific integrated circuits.

The following is a detailed description of the processing mobile terminal for implementing automatic startup provided by the present embodiment. An example is described where the mobile terminal is a mobile phone.

A memory 701, which can be accessed by the CPU 702, the peripheral interface 703, etc. The memory 701 may include a high speed random access memory, and may further include a non-volatile memory, such as one or more magnetic disk storage devices, flash memory devices, or other volatile solid-state storage devices.

A peripheral interface 703, which can connect the peripheral input and the peripheral output of the device to the CPU 702 and the memory 701.

An I/O subsystem 709, which can connect the peripheral input and the peripheral output on the device, for example, a touch screen 712 and other input/control device 710 are connected to the peripheral interface 703. The I/O subsystem 709 can include a display controller 7091 and one or more input controllers 7092 for controlling other input/control devices 710. Where the one or more input controllers 7092 receive electrical signals from other input/control devices 710 or send electrical signals to other input/control devices 710, and the other input/control devices 710 may include a physical button (a press button, a rocker button, etc.), a dial plate, a slide switch, a joystick and a click wheel. It should be noted that the input controller 7092 can be connected to any one of the following: a keyboard, an infrared port, a USB interface and a pointing device such as a mouse.

A touch screen 712, which is an input interface and an output interface between the user mobile terminal and the user to display a visible output to the user. The visible output may include graphics, texts, icons, videos, and the like.

The display controller 7091 in the I/O subsystem 709 receives the electrical signal from the touch screen 712 or sends the electrical signal to the touch screen 712. The touch screen 712 detects contact on the touch screen, and the display controller 7091 converts the detected contact into an interaction with a user interface object displayed on the touch screen 712, that is, to implement a human-computer interaction. The user interface object displayed on the touch screen 712 may be the icon of the running game, the icon connected to the corresponding network, and the like. It should be noted that the device may further include a light mouse, which is a touch sensitive surface that does not display the visible output, or an extension of a touch sensitive surface formed by the touch screen.

A RF circuit 705, which is mainly configured to establish communication between the mobile phone and the wireless network (i.e., the network side) and realize data reception and transmission between the mobile phone and the wireless network. For example, sending and receiving short messages, emails, and the like. Specifically, the RF circuit 705 receives and transmits the RF signal, which is also referred to as an electromagnetic signal. The RF circuit 705 converts the electrical signal into an electromagnetic signal or converts the electromagnetic signal into an electrical signal, and communicates with the communication network and other devices through the electromagnetic signal. The RF circuitry 705 may include known circuits for performing these functions, which includes but not limited to, an antenna system, a RF transceiver, one or more amplifiers, a tuner, one or more oscillators, a digital signal processor, a CODEC (COder-DECoder, codec) chipset, a subscriber identity module (SIM), etc.

An audio circuit 706, which is mainly configured to receive audio data from the peripheral interface 703, convert the audio data into an electrical signal, and transmit the electrical signal to a speaker 711.

The speaker 711, which is configured to restore a voice signal received by the mobile phone from the wireless network through RF circuit 705 to sound, and play the sound to the user.

A power supply management chip 708, which is configured to supply power and provide power management for the hardware connected to the CPU 702, the I/O subsystem and the peripheral interface.

The mobile terminal provided by the embodiment of the present application may process an application in the mobile terminal with an unknown startup manner.

The processing device, the storage medium and the mobile terminal provided in the above embodiments for implementing automatic startup may perform the processing method for implementing automatic startup provided by any embodiment of the present application, and may have corresponding functional modules and beneficial effects for performing the method. For the technical details that are not described in detail in the above embodiments, reference may be made to the processing method for implementing automatic startup provided by any embodiment of the present application.

Please note that the above are only the preferred embodiments of the present application and the technical principle applied thereto. A person skilled in the art will understand that the present application is not limited to the specific embodiments described herein, and that various changes, modifications and substitutions can be made by those skilled in the art without departing from the scope of the application. Although the present application is described in detail through the above embodiments, the present application is not limited to the above embodiments, and other equivalent embodiments may be included without departing from the concept of the present application. The application scope is defined by the scope of the accompanying claims.

What is claimed is:

1. A processing method for implementing automatic startup, comprising:
    acquiring, by a processing device for implementing automatic startup, program startup information and startup call information of an application when it is detected that a startup event for the application occurs, wherein the program startup information comprises a package name and package information of the application, and the startup call information comprises a startup caller, a startup call component and a startup call path;
    sending, by the processing device for implementing automatic startup, the program startup information and the startup call information to a server for acquiring a determination strategy for the application serving as a startup control strategy for the application, wherein the determination strategy is obtained by the server through analyzing the at least one of the program startup information and the startup call information;
    controlling, by the processing device for implementing automatic startup, startup of the application according to the startup control strategy for the application; and
    wherein the sending, by the processing device for implementing automatic startup, the program startup information and the startup call information to a server for acquiring a determination strategy for the application serving as a startup control strategy for the application, wherein the determination strategy is obtained by the server through analyzing the at least one of the program startup information and the startup call information, comprises:
        sending, by the processing device for implementing automatic startup, the program startup information and the startup call information to a server for determining a statistical result for a startup caller of the application, wherein the determination strategy for the application is determined according to the statistical result for the startup caller of the application, and the application is determined to be a malicious startup application when the statistical result for the startup caller of the application exceeds a predetermined threshold; and
        acquiring, by the processing device for implementing automatic startup, the determination strategy, and using the determination strategy as a startup control strategy for the application.

2. The processing method for implementing automatic startup according to claim 1, wherein the acquiring, by a processing device for implementing automatic startup, program startup information of an application, comprises:
    acquiring, by the processing device for implementing automatic startup, the program startup information of the application through a process management service.

3. The processing method for implementing automatic startup according to claim 1, wherein the acquiring, by a processing device for implementing automatic startup, startup call information of the application, comprises:
    determining, by a processing device for implementing automatic startup, the startup call information of the application by accessing a call stack.

4. The processing method for implementing automatic startup according to claim 1, wherein the sending, by the processing device for implementing automatic startup, the startup call information to a server, comprises:
    determining, by the processing device for implementing automatic startup, a startup manner of the application according to the startup call information;
    in response to determining that the startup manner of the application is unknown, sending, by the processing device for implementing automatic startup, the at least one of the program startup information and the startup call information to the server;
    in response to determining that the startup manner of the application is known, setting, by the processing device for implementing automatic startup, a local startup control strategy as the startup control strategy for the application.

5. The processing method for implementing automatic startup according to claim 1, wherein the determining, by the processing device for implementing automatic startup, a startup manner of the application, comprises:
    when at least one of the startup caller, the startup call component and the startup call path is unknown, determining, by the processing device for implementing automatic startup, that the startup manner of the application is unknown;
    when the startup caller, the startup call component and the startup call path are all known, determining, by the processing device for implementing automatic startup, that the startup manner of the application is known.

6. The processing method for implementing automatic startup according to claim 1, wherein the controlling, by the processing device for implementing automatic startup, startup of the application according to the startup control strategy for the application, comprises:
    if it is determined, according to the startup control strategy for the application, not to start the application, closing, by the processing device for implementing automatic startup, the application after the application is started; or, terminating, by the processing device for implementing automatic startup, the application during the startup of the application.

7. The processing method for implementing automatic startup according to claim 6, wherein the terminating, by the processing device for implementing automatic startup, the application during the startup of the application, comprises:
    recycling, by the processing device for implementing automatic startup, a first process started by the application.

8. The processing method for implementing automatic startup according to claim 1, further comprising:
    acquiring, by the processing device for implementing automatic startup, startup scene information when it is detected that a startup event for the application occurs, wherein the startup scene information comprises: one or more of screen status, a system interface, battery information and memory utilization when the startup event for the application occurs;
    correspondingly, wherein the sending, by the processing device for implementing automatic startup, the program startup information and the startup call information to a server for acquiring a determination strategy for the application serving as a startup control strategy for the application, comprises:
        sending, by the processing device for implementing automatic startup, the startup scene information and the program startup information and the startup call information, to the server for acquiring the determination strategy for the application serving as the startup control strategy for the application, wherein the determination strategy is obtained by the server through analyzing the startup scene information and the at least one of the program startup information and the startup call information.

9. The processing method for implementing automatic startup according to claim 1, wherein the startup event for the application comprises:
a first process is created during the startup of the application or a predefined broadcast message is sent by the application.

10. A processing device for implementing automatic startup, comprising:
a processor, configured to acquire program startup information and startup call information of an application when it is detected that a startup event for the application occurs, wherein the program startup information comprises a package name and package information of the application, and the startup call information comprises a startup caller, a startup call component and a startup call path;
a transmitter, configured to send the program startup information and the startup call information to a server for acquiring a determination strategy for the application serving as a startup control strategy for the application, wherein the determination strategy is obtained by the server through analyzing the at least one of the program startup information and the startup call information;
the processor is further configured to control startup of the application according to the startup control strategy for the application;
wherein the transmitter is further configured to send the program startup information and the startup call information to a server for determining a statistical result for a startup caller of the application, wherein the determination strategy for the application is determined according to the statistical result for the startup caller of the application, and the application is determined to be a malicious startup application when the statistical result for the startup caller of the application exceeds a predetermined threshold; and
the processor is further configured to acquire the determination strategy, and use the determination strategy as a startup control strategy for the application.

11. The processing device for implementing automatic startup according to claim 10, wherein the processor is configured to:
acquire the program startup information of the application through a process management service.

12. The processing device for implementing automatic startup according to claim 10, wherein the processor is configured to:
determine the startup call information of the application by accessing a call stack.

13. The processing device for implementing automatic startup according to claim 10, wherein the transmitter is configured to:
determine a startup manner of the application according to the startup call information;
in response to determining that the startup manner of the application is unknown, send the at least one of the program startup information and the startup call information to the server;
in response to determining that the startup manner of the application is known, set a local startup control strategy as the startup control strategy for the application.

14. The processing device for implementing automatic startup according to claim 10, wherein the transmitter is configured to:
when at least one of the startup caller, the startup call component and the startup call path is unknown, determine that the startup manner of the application is unknown;
when the startup caller, the startup call component and the startup call path are all known, determine that the startup manner of the application is known.

15. The processing device for implementing automatic startup according to claim 10, wherein the processor is configured to:
if it is determined, according to the startup control strategy for the application, not to start the application, close the application after the application is started; or, terminate the application during the startup of the application.

16. The processing device for implementing automatic startup according to claim 10, the processor is further configured to:
acquire startup scene information when it is detected that a startup event for the application occurs, wherein the startup scene information comprises: one or more of screen status, a system interface, battery information and memory utilization when the startup event for the application occurs;
correspondingly, the transmitter is configured to:
send the startup scene information and the program startup information and the startup call information, to the server for acquiring the determination strategy for the application serving as the startup control strategy for the application, wherein the determination strategy is obtained by the server through analyzing the startup scene information and the at least one of the program startup information and the startup call information.

17. A non-transitory computer readable storage medium storing a computer program thereon, wherein the program is executed by a processor to implement the following steps:
acquiring, by a processing device for implementing automatic startup, program startup information and startup call information of an application when it is detected that a startup event for the application occurs, wherein the program startup information comprises a package name and package information of the application, and the startup call information comprises a startup caller, a startup call component and a startup call path;
sending, by the processing device for implementing automatic startup, the program startup information and the startup call information to a server for acquiring a determination strategy for the application serving as a startup control strategy for the application, wherein the determination strategy is obtained by the server through analyzing the at least one of the program startup information and the startup call information;
controlling, by the processing device for implementing automatic startup, startup of the application according to the startup control strategy for the application; and
wherein the sending, by the processing device for implementing automatic startup, the program startup information and the startup call information to a server for acquiring a determination strategy for the application serving as a startup control strategy for the application, wherein the determination strategy is obtained by the server through analyzing the at least one of the program startup information and the startup call information, comprises:

sending, by the processing device for implementing automatic startup, the program startup information and the startup call information to a server for determining a statistical result for a startup caller of the application, wherein the determination strategy for the application is determined according to the statistical result for the startup caller of the application, and the application is determined to be a malicious startup application when the statistical result for the startup caller of the application exceeds a predetermined threshold; and acquiring, by the processing device for implementing automatic startup, the determination strategy, and using the determination strategy as a startup control strategy for the application.

* * * * *

UNITED STATES PATENT AND TRADEMARK OFFICE
CERTIFICATE OF CORRECTION

PATENT NO. : 10,956,176 B2  
APPLICATION NO. : 16/107612  
DATED : March 23, 2021  
INVENTOR(S) : Zhiyong Lin et al.

Page 1 of 1

It is certified that error appears in the above-identified patent and that said Letters Patent is hereby corrected as shown below:

On the Title Page (71) Applicant:  
"GUANGDONG OPPO MOBILE TELECOMMUNICATIONS CORP., LTD., Guangdong (CN)"  
Should read as:  
--GUANGDONG OPPO MOBILE TELECOMMUNICATIONS CORP., LTD., Dongguan, Guangdong (CN)--

(73) Assignee:  
"GUANGDONG OPPO MOBILE TELECOMMUNICATIONS CORP., LTD., Guangdong (CN)"  
Should read as:  
--GUANGDONG OPPO MOBILE TELECOMMUNICATIONS CORP., LTD., Dongguan, Guangdong (CN)--

Signed and Sealed this  
Fourth Day of May, 2021

Drew Hirshfeld  
*Performing the Functions and Duties of the  
Under Secretary of Commerce for Intellectual Property and  
Director of the United States Patent and Trademark Office*